Patented July 8, 1947

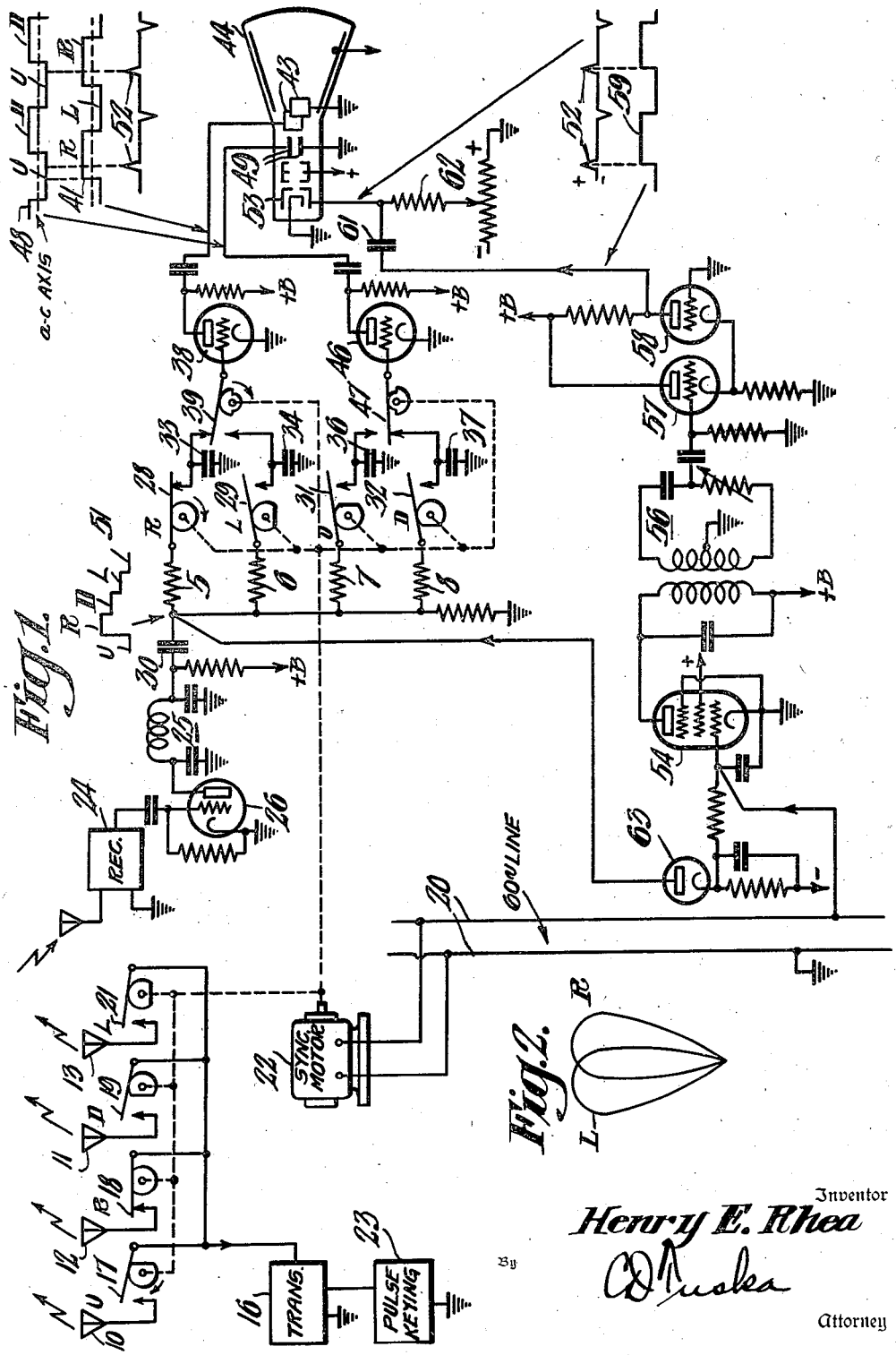

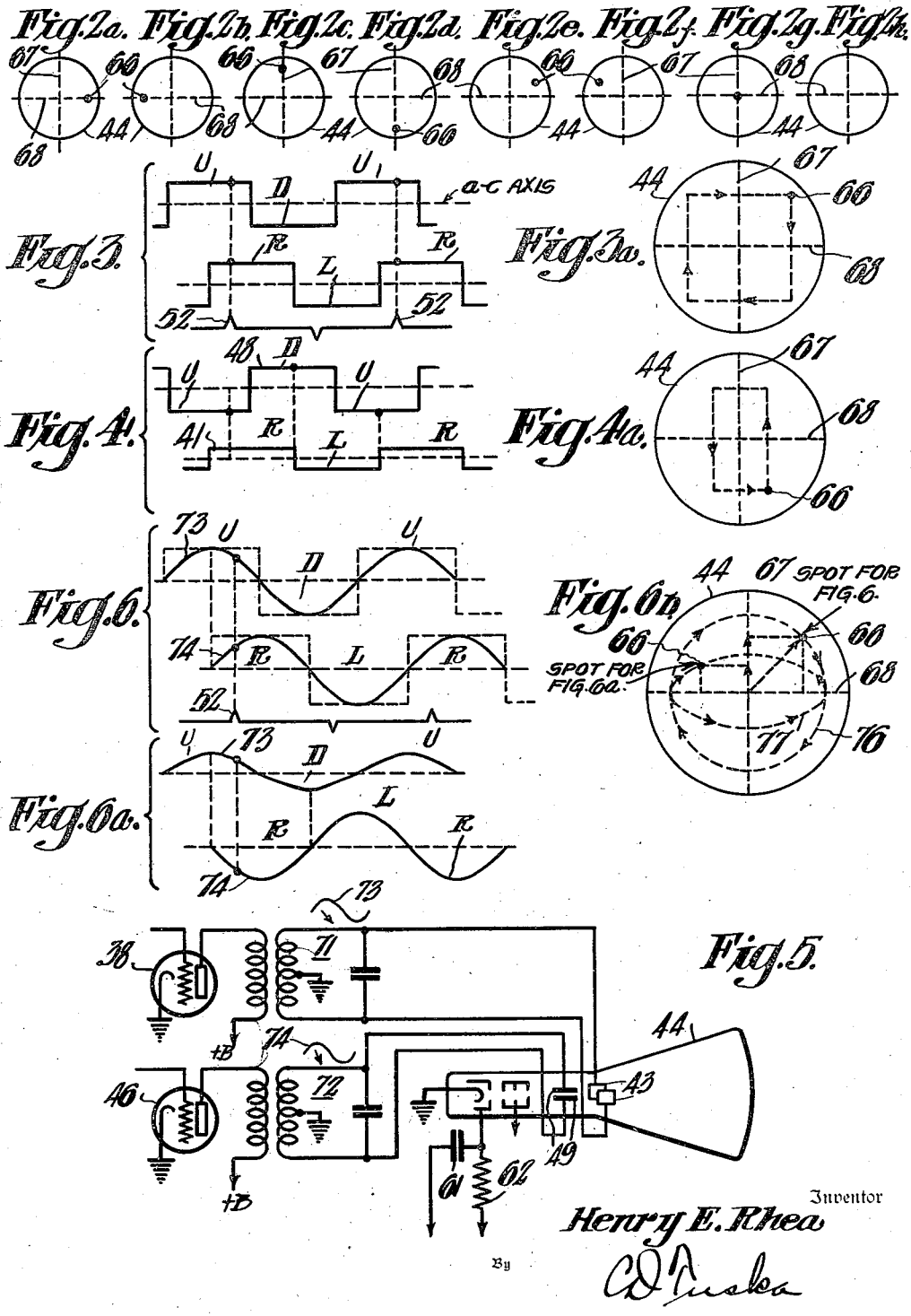

2,423,661

UNITED STATES PATENT OFFICE 2,423,661

REFLECTED WAVE DIRECTION FINDER

Henry E. Rhea, Collingswood, N. J., assignor to Radio Corporation of America, a corporation of Delaware Application November 27, 1943, Serial No. 512,029

10 Claims. (Cl. 250—1.72)

My invention relates to cathode ray indicator systems and particularly to systems for indicating the position of an object with respect to a radio transmitter.

The invention will be described specifically as applied to a pulse-echo system wherein the transmitter radiates signals from antennas having overlapping directional radiation patterns, the indicator functioning to give the position of the said object with respect to the radiation patterns, and particularly to inform an operator when the object is located at the center line or region of equal signal intensity of the overlapping patterns.

An object of the invention is to provide an improved indicator for direction finding or object locating apparatus.

A further object of the invention is to provide an improved cathode ray indicator system for indicating the position of an object with respect to overlapping radiation patterns.

A still further object of the invention is to provide an improved indicator for radio pulse-echo apparatus.

A still further object of the invention is to provide an improved indicator for pulse-echo gun control apparatus or the like wherein a cathode ray spot on the indicator is centered on crosshairs when the gun is trained on the target.

In a preferred embodiment, the invention is applied to a pulse-echo system having a directive antenna system so designed that its radiation pattern or patterns may be moved in both a horizontal plane and a vertical plane to search for an object such as an enemy airplane. The antenna system may consist of four directive antennas which may be keyed successively, as described, for example, in application Serial No. 259,057, filed February 28, 1939, in the name of Irving Wolff, Patent No. 2,412,702, dated December 17, 1946, and entitled Object detection and location, or an antenna system may be employed which is keyed by means of shorting condensers as described and claimed in application Serial No. 412,943, filed September 30, 1941, in the name of George H. Brown, Patent No. 2,400,736, dated May 21, 1946, and entitled Antenna systems.

In the receiver, the horizontal and vertical deflecting plates of a cathode ray tube have applied to them either square wave or sine wave deflecting voltages which are derived from the received pulses that have been reflected from the target or other object and which are 90 degrees out of phase with respect to each other. The deflecting voltages that are applied to each pair of deflecting plates may be obtained from a peak voltage measuring circuit that is switched in synchronism with the keying of the directive antennas. Thus the horizontal deflection component is determined by the relative amplitudes of the reflected pulses in the two horizontal radiation patterns and the vertical deflection component is similarly determined by the reflected pulses in the two vertical radiation patterns. The cathode ray is normally biased to cut-off and is keyed on in a fixed time relation to the two deflecting voltages to produce a spot indication on the fluorescent screen of the tube.

The invention will be better understood from the following description taken in connection with the accompanying drawing in which Figure 1 is a circuit and block diagram of one of the preferred embodiments of my invention, Figure 2 is a diagram of the radiation patterns of the right-left directive antennas employed in the system of Fig. 1, Figures 2a to 2h are views of the screen end of the cathode ray tube employed in the system of Fig. 1 showing the position of the cathode ray spot for different relative positions of the transmitter radiation patterns and the object or target, Figures 3 and 4 are graphs showing the cathode ray deflecting voltages in one embodiment of the invention for two different positions of the antenna radiation patterns with respect to the target, Figures 3a and 4a are views of the screen end of the cathode ray tube of Fig. 1 which are referred to in explaining how the cathode ray spot is positioned by the deflecting voltages of Figs. 3 and 4, respectively, Figure 5 is a circuit diagram illustrating a modification of the circuit shown in Fig. 1, Figures 6 and 6a are graphs showing the cathode ray deflecting voltages applied to the indicator of Fig. 5 for two different positions of the antenna radiation patterns with respect to the target, and Figure 6b is a view of the screen end of the cathode ray tube in Fig. 5 which is referred to in explaining how the cathode ray spot is positioned by the deflecting voltages shown in Figs. 6 and 6a.

In the several figures, similar parts are indicated by similar reference characters.

In Fig. 1, my indicator is applied to a radio pulse-echo system comprising four directive antennas 10, 11, 12 and 13 for radiating up, down, right and left patterns, respectively, as indicated by the letters U, D, R and L. The radiation patterns for these antennas are overlapping conical patterns of the character indicated in Fig. 2 where only the right-left patterns are shown. The patterns marked R and L correspond to the antennas similarly marked in Fig. 1. The antennas 10, 11, 12 and 13 may be like those illustrated in the above-mentioned Wolff application, or of any other suitable type, and in the particular system being described are arranged so that their radiation patterns scan both horizontally and vertically.

High frequency radio pulses are supplied successively to the U, R, D and L antennas from a transmitter 16 through cam operated switches 17, 18, 19 and 21, respectively, driven by a synchronous motor 22 connected to a power line 20. The said pulses are obtained by modulating the high frequency carrier wave produced at transmitter 16 by means of keying pulses from a source 23. The source 23 may be a multivibrator supplying pulses recurring at the rate of 4.1 kilocycles per second, for example.

The receiver 24 demodulates the reflected pulses of high frequency energy to supply 4.1 kc. pulses to a detector or rectifier 26 which preferably is of the peak rectifying type. In the circuit illustrated the rectifier 26 is a grid-leak biased peak rectifier tube which is well known in the television art. The output of the rectifier 26 is passed through a low pass filter 25 and supplied through a large capacity blocking condenser 30, through resistors 5, 6, 7 and 8 and through cam operated switches 28, 29, 31 and 32 to condensers 33, 34, 36 and 37, respectively. The output from the filter 25 is represented by the graph 51 where the four groups of filtered or integrated pulses of unequal amplitude are indicated at U, R, D, L.

The resistors 5, 6, 7 and 8 are provided to make the time constant of the condenser circuits long enough to smooth out and substantially eliminate the effect of any high frequency noise pulses that may be received. An amplifier tube 38 has its input electrodes connected alternately across condensers 33 and 34 by means of a cam operated switch 39 whereby the voltage at the anode of tube 38 is the square wave voltage 41. This voltage, in the particular embodiment being described, is applied to the horizontal deflecting plates 43 of a cathode ray indicator tube 44.

An amplifier tube 46 has its input electrodes connected alternately across condensers 36 and 37 by means of a cam operated switch 47 whereby the voltage at the anode of the tube 46 is the square wave voltage 48. This voltage is applied to the vertical deflecting plates 49 of the tube 44.

The switches 28, 29, 31, 32, 39 and 47 are driven in synchronism with the antenna switches 17, 18, 19 and 21 by the motor 22. The switching sequence in this particular example is U, R, D, L as will be apparent from the shape of the cams and from the direction of rotation indicated by the arrows. The complete switching cycle may occupy 1/60 second, for example. When the "right" antenna switch 18 is closed, the corresponding "right" switch 28 of the indicator is also closed. Likewise, the switch 39 is closed in its upper position and will remain closed until the cams rotate through 180 degrees at which time the "left" switches 21 and 29 close and the switch 39 is closed in its lower position whereby the square wave 41 is produced.

The "R" and "L" cycles of the wave 41 approach its a—c axis to become a straight line (zero square wave) when the equi-signal line of the right-left radiation patterns is "on" the target. Similarly, the operation of the switches 31, 32 and 47 produces the square wave 48, this wave also going to zero value when the equi-signal line of the up-down antenna radiation patterns is "on" the target.

The cathode ray of the tube 44 is biased to cut-off until a positive pulse 52 is applied to the control grid 53 of the tube 44. In the example illustrated, the pulse 52 is applied while the U and R deflecting voltages are on the deflecting plates 49 and 43, respectively. Thus a spot will appear in one of four quadrants of the screen, the quadrant depending upon the polarities of the deflecting voltages. The distance that the spot will be from the center of the screen will depend upon the amplitudes of the deflecting voltages. If there is no incoming signal, due to an A. V. C. action, no pulse 52 will be produced and, therefore, there will be no indication on the fluorescent screen.

The pulse 52 may be produced by supplying 60 cycle sine wave voltage from the power line 20 through an amplifier tube 54 and a phase shifting network 56 to a pair of clipping tubes 57 and 58 whereby a square wave 59 is obtained. The wave 59 is differentiated by the grid circuit of the cathode ray tube 44 which includes a grid condenser 61 and a grid-leak resistor 62 whereby the desired positive pulses 52 are produced. By adjusting the phase shifter 56 the pulses 52 may be properly phased with respect to the square wave deflecting voltages 41 and 48.

An A. V. C. circuit comprising a diode 63 connected to the receiver output permits the amplifier tube 54 to pass the sine wave voltage only when there is an incoming signal. Thus, the cathode ray is blocked as long as no signal is being received so that there will be no false indication.

Figs. 2a to 2h illustrate the position of the cathode ray spot 66 with respect to the cross-hairs 67 and 68 for the following locations of the target with respect to the center line of the right-left and up-down radiation patterns: Fig. 2a—target to right; Fig. 2b—target to left; Fig. 2c—target up; Fig. 2d—target down; Fig. 2e—target up and to the right; Fig. 2f—target up and to the left; Fig. 2g—the "on target" position, i. e., target at center line of right-left and up-down radiation patterns; Fig. 2h—no incoming signal and, therefore, no spot indication.

Figs. 3 and 3a illustrate how the cathode ray spot position depends upon the polarities and amplitudes of the right-left and up-down deflecting voltages. For the condition shown in Fig. 3, the voltage during the "up" switching period U deflects the cathode ray up while the voltage during the "right" switching period R deflects the cathode ray to the right. During the U and R periods, the cathode ray is "keyed on" for an instant by the pulse 52 to produce the spot 66 which appears in the upper right hand quadrant (Fig. 3a). The cathode ray trace that would be produced if the cathode ray were not blocked at any time during the full switching cycle of up, right, down, left is indicated by the broken line rectangle, the arrows showing the direction of deflection. The distance of the spot 66 from the center of the cross-hairs obviously depends upon the amplitude of the deflecting voltages with respect to their a—c axes.

Figs. 4 and 4a, which correspond to Figs. 3 and 3a, respectively, show how the spot 66 moves to a lower quadrant when the polarity of the U cycle reverses, and how its distance from the vertical cross-hair 67 is less when the amplitude of the R cycle becomes less.

Fig. 5 shows how the circuit of Fig. 1 may be modified for applying sine wave voltages to the deflecting plates 43 and 49 rather than the square wave voltages 41 and 48. In Fig. 5, the tubes 38 and 46 supply the right-left and up-down square waves to the tuned circuits 71 and 72, respectively, which are tuned to the fundamental frequency of the square waves, this being 60 cycles per second in the present example. The resulting sine wave voltages 73 and 74 are applied to the deflecting plates 43 and 49, respectively.

Fig. 6 shows the phase relation of the sine waves 73 and 74 and of the keying pulse 52. With the polarity and amplitude of the waves 73 and 74, as shown in Fig. 6, a circular deflecting field will be produced for the cathode ray as indicated by the dotted circle 76 in Fig. 6b, and the spot 66 will appear on this circular path at the position shown.

Fig. 6a shows the sine wave 73 reduced in amplitude by one-half and shows the sine wave 74 reversed in polarity. The resulting deflecting field is an ellipse as indicated at 77 in Fig. 6b, and the spot 66 will appear on this elliptical path at the position shown. Thus it will be seen that Fig. 5 provides the same kind of position indications as illustrated in Figs. 2a to 2h.

I claim as my invention:

1. An indicator for a radio pulse-echo system of the type comprising a plurality of directive antennas having overlapping radiation patterns in the horizontal plane and having overlapping patterns in the vertical plane, a radio pulse transmitter unit and a radio pulse receiver unit, means for switching said antennas successively to at least one of said units, said indicator comprising a cathode ray tube having a pair of horizontal deflecting elements and a pair of vertical deflecting elements, means for obtaining an alternating-current wave that is a measure of the relative amplitudes of the two groups of reflected pulses in said horizontal plane, means for applying said wave to said pair of horizontal deflecting elements to deflect the cathode ray of said tube in one direction, means for obtaining a second alternating-current wave that is a measure of the amplitude of the two groups of reflected pulses in the vertical plane, means for applying said second wave to said pair of vertical deflecting elements, and means for changing the intensity of said cathode ray periodically and in synchronism with said alternating-current waves.

2. The invention according to claim 1 wherein each of said alternating-current waves is a square wave.

3. The invention according to claim 1 wherein each of said alternating-current waves is a sine wave.

4. The invention according to claim 1 wherein each of said alternating-current waves is a sine wave and wherein said last means includes means for increasing the intensity of said cathode ray during the middle portion of a switching period.

5. The invention according to claim 1 wherein an automatic volume control circuit is provided to make said last means ineffective in the absence of an incoming signal.

6. An indicator for a radio pulse-echo system of the type comprising a plurality of directive antennas having overlapping radiation patterns in the horizontal plane and having overlapping patterns in the vertical plane, a radio pulse transmitter unit and a radio pulse receiver unit, means for switching said antennas successively to at least one of said units, said indicator comprising a cathode ray tube having a pair of horizontal deflecting elements and a pair of vertical deflecting elements, means for obtaining an alternating-current wave that is a measure of the relative amplitudes of the two groups of reflected pulses in said horizontal plane, means for applying said wave to said pair of horizontal deflecting elements to deflect the cathode ray of said tube in one direction, means for obtaining a second alternating-current wave that is a measure of the amplitude of the two groups of reflected pulses in the vertical plane, means for applying said second wave to said pair of vertical deflecting elements, and means for increasing the intensity of said cathode ray once during each complete cycle of said antenna switching and in synchronism with said alternating-current waves.

7. The invention according to claim 6 wherein said last means comprises means for producing a square wave and means for differentiating said square wave to produce positive pulses which are applied to said cathode ray tube.

8. An indicator for a radio pulse-echo system of the type comprising a plurality of directive antennas having overlapping radiation patterns in the horizontal plane and having overlapping patterns in the vertical plane, a radio pulse transmitter unit and a radio pulse receiver unit, means including a synchronous motor connected to a power line for switching said antennas successively to at least one of said units, said indicator comprising a cathode ray tube having a pair of horizontal deflecting elements and a pair of vertical deflecting elements, means for obtaining an alternating-current wave that is a measure of the relative amplitudes of the two groups of reflected pulses in said horizontal plane, means for applying said wave to said pair of horizontal deflecting elements to deflect the cathode ray of said tube in one direction, means for obtaining a second alternating-current wave that is a measure of the amplitude of the two groups of reflected pulses in the vertical plane, means for applying said second wave to said pair of vertical deflecting elements, and means for changing the intensity of said cathode ray periodically and in synchronism with said alternating-current waves, said last means comprising a phase shifter connected to said power line, wave clipping means connected to said phase shifter for changing the sine wave of the power line supply to a square wave, and means for differentiating said square wave and for applying the resulting positive pulses to said cathode ray tube for producing said change in cathode ray intensity.

9. In combination, means for transmitting radio signals and means for receiving them after reflection from a reflecting object, at least one of said means including an assembly of directive antennas having in each of two planes overlapping radiation patterns, switching means for making said patterns effective successively to supply signal to a receiving circuit, said radiation patterns having characteristics such that the received signal differs in strength for the successive radiation patterns in accordance with the displacement of said radiation patterns with respect to the reflecting object, two pairs of capacitors included in said receiving circuit, receiver switching means synchronized with the antenna assembly switching means, means comprising said synchronized switching means and said receiving means for charging each of said capacitors in accordance with the received signal during the intervals that each of said radiation patterns, respectively, is effective to supply signal to the receiving means, a cathode ray tube indicator having two pairs of deflecting elements angularly displaced with respect to each other, means for applying to one pair of said deflecting elements an alternating-current wave proportional in amplitude to the voltages across one pair of said capacitors, means for applying to the other pair of said deflecting elements a second alternating-current wave proportional in amplitude to the voltages across the other pair of said capacitors, and means for changing the intensity of said cathode ray periodically and in synchronism with said alternating current waves.

10. An indicator for a radio pulse-echo system of the type comprising a plurality of directive antennas having overlapping radiation patterns in the horizontal plane and having overlapping patterns in the vertical plane, a radio pulse transmitter unit and a radio pulse receiver unit, means for switching said antennas successively to at least one of said units, said indicator comprising a cathode ray tube having a pair of horizontal deflecting elements and a pair of vertical deflecting elements, means comprising two storage capacitors for obtaining thereacross two voltages, respectively, which are a measure of the amplitudes of the two groups of reflected pulses in said horizontal plane, switching means for converting said two voltages to an alternating-current wave that is a measure of the relative amplitudes of the two groups of reflected pulses in said horizontal plane, means for applying said wave to said horizontal deflecting elements, means comprising two storage capacitors for obtaining thereacross two voltages, respectively, which are a measure of the amplitudes of the two groups of reflected pulses in said vertical plane, switching means for converting said last two voltages to an alternating-current wave that is a measure of the relative amplitudes of the two groups of reflected pulses in said vertical plane, means for applying said last wave to said pair of vertical deflecting elements, and means for changing the intensity of said cathode ray periodically and in synchronism with said alternating-current waves.

HENRY E. RHEA.